United States Patent
Galpin

(10) Patent No.: US 7,043,728 B1
(45) Date of Patent: May 9, 2006

(54) METHODS AND APPARATUS FOR FAULT-DETECTING AND FAULT-TOLERANT PROCESS CONTROL

(75) Inventor: Samuel Galpin, Hingham, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 09/328,828

(22) Filed: Jun. 8, 1999

(51) Int. Cl.
    *G06F 9/46* (2006.01)

(52) U.S. Cl. .................. 718/102; 718/100; 718/103

(58) Field of Classification Search ............. 718/1–108
    See application file for complete search history.

(56) References Cited

U.S. PATENT DOCUMENTS

| | | |
|---|---|---|
| 3,825,905 A | 7/1974 | Allen, Jr. |
| 4,312,068 A | 1/1982 | Goss et al. |
| 4,323,966 A | 4/1982 | Whiteside et al. |
| 4,347,563 A | 8/1982 | Paredes et al. |
| 4,377,000 A * | 3/1983 | Staab ............... 714/55 |
| 4,456,997 A | 6/1984 | Spitza |
| 4,805,107 A | 2/1989 | Kieckhafer et al. |
| 4,816,996 A | 3/1989 | Hill et al. |
| 4,817,094 A | 3/1989 | Lebizay et al. |
| 5,008,805 A | 4/1991 | Fiebig et al. |
| 5,050,165 A | 9/1991 | Yoshioka et al. |
| 5,138,708 A | 8/1992 | Vosbury |
| 5,146,589 A | 9/1992 | Peet, Jr. et al. |
| 5,163,055 A | 11/1992 | Lee et al. |
| 5,175,829 A | 12/1992 | Stumpf et al. |
| 5,193,175 A | 3/1993 | Cutts, Jr. et al. |
| 5,233,615 A | 8/1993 | Goetz |
| 5,255,367 A | 10/1993 | Bruckert et al. |
| 5,258,999 A | 11/1993 | Wernimont et al. |
| 5,271,013 A | 12/1993 | Gleeson |
| 5,428,781 A | 6/1995 | Duault et al. |
| 5,450,403 A | 9/1995 | Ichii et al. |
| 5,450,425 A | 9/1995 | Gunn et al. |
| 5,469,570 A | 11/1995 | Shibata |
| 5,513,192 A | 4/1996 | Janku et al. |
| 5,513,354 A | 4/1996 | Dwork et al. |
| 5,551,047 A | 8/1996 | Mori et al. |

(Continued)

OTHER PUBLICATIONS

"Agenda," ISA/SP50—1988-180, ISA Draft.

(Continued)

*Primary Examiner*—Meng-Al T. An
*Assistant Examiner*—Kenneth Tang
(74) *Attorney, Agent, or Firm*—David J. Powsner; Nutter McClennen & Fish LLP

(57) ABSTRACT

A method of process, industrial, environmental or other control includes executing a first sequence of instructions in a first process (or thread) and executing a second sequence of instructions in a second process (or thread) that is loosely coupled with the first. States of the first and second processes are compared following their respective completions of the first and second instruction sequences. The comparison can cover registers, memory, flags, interrupts, tasks, and/or events in each of the respective processes. Execution of further instruction sequences by either process is delayed pending a favorable comparison of the process states. If the process achieve comparable states, the first process can take up execution of a third sequence, while the second process takes up execution of a fourth sequence. In the event that one of the processes does not complete its respective instruction sequence within a set period of time, or if the process states do not otherwise favorably compare after execution of the respective sequences, the method calls for signaling an error. A device for process, industrial, environmental or other control operates in accord with such a method.

14 Claims, 4 Drawing Sheets

U.S. PATENT DOCUMENTS

| | | | |
|---|---|---|---|
| 5,559,963 A | 9/1996 | Gregg et al. | |
| 5,623,670 A * | 4/1997 | Bohannon et al. | 710/200 |
| 5,629,949 A | 5/1997 | Zook | |
| 5,630,056 A | 5/1997 | Horvath et al. | |
| 5,680,404 A | 10/1997 | Gray | |
| 5,787,272 A | 7/1998 | Gupta et al. | |
| 5,867,704 A | 2/1999 | Tanaka et al. | |
| 5,931,959 A * | 8/1999 | Kwiat | 714/48 |
| 5,938,775 A | 8/1999 | Damani et al. | |
| 5,940,839 A * | 8/1999 | Chen et al. | 707/202 |
| 5,978,933 A * | 11/1999 | Wyld et al. | 714/13 |
| 6,212,608 B1 * | 4/2001 | Bak | 711/152 |
| 6,499,048 B1 * | 12/2002 | Williams | 718/102 |

OTHER PUBLICATIONS

Application of PRIAM Model to Safety Systems on Offshore Oil/Gas Platforms. Silvertech Ltd., Jan. 9, 1995.
"Automation System Monitors, Controls Fab HVAC, Other Systems," *Microcontamination* (Aug. 1994).
Batch Control. Part I: Models and Terminology. (Approved Feb. 28, 1995) ISA-S8801 1995.
Benkhallat, Yazid, et al. "Interoperability of sensors and distributed systems," *Sensors and Actuators* A vol. 37-38 (1993), 247-254.
Blevins, Terry. "Characteristics of Function Block Requirements for the Process Industry and Manufacturing Automation," Fisher-Rosemount, Oct. 31, 1995.
Brunn, P. "Collision Avoidance for Two Robots Sharing a Common Workspace," (1995) The Institution of Electrical Engineers.
Burton, P. I. "A personal history of batch control," *Measurement + Control* vol. 27 (Apr. 1994), pp. 69-73.
Burton, P. I., et al. "Field Bus Based on MIL-STD-1553B: Proposal to ISA-SP-50" ERA Technology Ltd. (Apr. 6, 1988) ISA/SP50-1988-148.
Capetta, L., et al. "From Current Actuators and Transmitters Towards Intelligent Actuation and Measurement: PRIAM Approach," BIAS 93.
Caro, Richard H. "Field Bus Applications," ISA (1989) Paper #89-0569, pp. 989-994.
Caro, Richard H. "The Fifth Generation Process Control Architecture," ISA (1988) Paper #88-1487, pp. 659-667.
Caro, Richard House Fifth Generation Process Control Architecture, *ISA Transactions* vol. 28 No. 4 (1989) pp. 23-28.
Chettle, Tim. "Multiplexing techniques optimise data collection," *Electrotechnology* (Oct./Nov. 1995).
Coleman, Vernon. "National Electrical Manufacturers Association Field Bus Report to ISA SP50," (Oct. 1988) ISA/SP50-1988-234.
Conference Record of the 1993 IEEE Industry Applications Conference, Part III (excerpt).
Contents, Proceedings of the Second International Workshop on Configurable Distributed Systems, Mar. 21-23, 1994, Pittsburgh, PA.
Craig, Lynn W. "SP-88 Defines Batch Control," *INTECH* Mar. 1994, pp. 34-37.
Crowder, R. S. "A Communication Architecture for Automation & Control," ISA, pp. 669-673.
Crowder, R. S.. "Generic Data Link Transactions for Simple Devices," Proposal to ISA SP 50 & IEC/SC65C/WG6 (Oct. 15, 1988) ISA Document.
Delahostria. Communication Model Application Layer. (Oct. 14, 1988) ISA/SP50-1988 247, ISA Draft.

Delfino, B. and Pinceti, P. "Fieldbus Applications for Electrical Industrial Systems," *IEEE* (1993), pp. 2084-2090.
Dezso, Danyi. "Halozati szabalyozas," *Meres es Automatika* vol. 37 (1989), pp. 208-213.
Editing Committee Draft Application Layer, Version 6, Dec. 1990.
Editing Committee Draft Application Layer, Version 8, May 1991.
Editing Committee Draft Application Layer, Version 12, Oct. 1991.
Esprit Project 6188, "PRIAM Dictionary: Major Terms and Definitions Used in the PRIAM Project," Prenormative Requirements for Intelligent Actuation and Measurement, May 1995.
Esprit Project 8244, "User Requirements for Intelligent Transmitters and Actuators," European Intelligent Actuation and Measurement User Group, Nov. 24, 1995.
Fieldbus Standard for Use in Industrial Control Systems. Part 2: Physical Layer Specification and Service Definition. (1992) ANSI/ISA-S50.02.
Foxboro Fieldbus Proposal (Presented to ISP SP-50 Committee (Feb. 24, 1988) ISA/SP50-1988-123B, ISA Draft.
Furness, Harry. "Fieldbus: The Differences Start From the Bottom Up," *Control Engineering* (Mar. 1994), pp. 75-77.
Holding, David and Wood, Graham. "Communications in microprocessor industrial implementation," *Microprocessors and Microsystems* vol. 3 No. 10 (Dec. 1979), pp. 443-451.
Johnson, Dick. "Pressure Sensing Advances: Are They in Your Process' Future?" *Control Engineering* (Apr. 1995), pp. 67-72.
Kelly, D. Mark. "Digital fieldbus cluster cuts plant's wiring costs up to 20%," *INTECH* (Apr. 1995), pp. 62-64.
Koth, H. and Oeder, K. "The Advantages of Intelligent Field Modules for Nuclear Power Plant Operation and Maintenance," Kerntechnik 60 (1996) 5-6, pp. 215-219.
Lenhart, Gerald W. "A Field Bus Approach to Local Control Networks," ISA, Paper #93-281 1993.
Lenhart, Gerald W. "Fieldbus-Based Local Control Networks," *INTECH* (Aug. 1994), p. 31-34.
Loose, Graham "Fieldbus—the user's perspective," *Measurement + Control* vol. 27 (Mar. 1994), pp. 47-51.
Meeting Minutes, SP50, International Electrotechnical Commission, Technical Committee No. 65: Industrial-Process Measurement and Control, Sub-Committee 65C: Digital Data Communications for Measurement and Control and Working Group 6: Field Bus Standard for Use in Industrial Control Systems, Feb. 28-Mar. 4, 1988, Scottsdale, AZ.
Meeting Minutes, SP50.4 Application Layer, Oct. 19-21, 1988, Houston, TX.
Meeting Minutes, Windows Working Group of Application Subcommittee, Mar. 1-3, 1989, New Orleans, LA.
Meeting Minutes, Ad Hoc Function Block Meeting, Jun. 14, 1990, Chapel Hill, NC.
Meeting Minutes, SP50, Signal Compatibility of Electrical Instruments, Dec. 5-7, 1990, Orlando, FL.
Meeting Minutes, Process Control Working Group of SP50. 4, Jan. 21-23, 1991, Atlanta, GA.
Meeting Notes, International Electrotechnical Commission Sub Committee No. 65C: Digital Communications Working Group 7, Process Control Function Blocks Report to AMT/7. Apr. 4, 1996.
Mirabella, Orazio. "A Short Presentation of IEC Fieldbus Application Layer," Informatics and Communication Institute, Engineering Faculty, University of Catania, Italy.

Morel, G., et al. "Discrete Event Automation Engineering: Outline of the PRIAM Project."

"NCR Fieldbus Slave Controller Advance Information," ISA-SP50-1988-161, ISA Draft.

NOAH: Network Oriented Application Harmonisation based on General Purpose Field Communication System. Project description rev. 1.0, Oct. 25, 1995, P-NET, PROFIBUS, WorldFIP.

Nobuhiko, Tsuji, et al. "An Advanced Optical Fieldbus Instrumentation System Using 16 × 16 Reflection Type Optical Star Coupler and Low Powered Transmitter," pp. 755-764.

Output to Valve, Revision No. 1.4, Jan. 18, 1991, (Draft Document), Instrument Society of America.

Owen, S., et al. "A modular reconfigurable approach to the creation of flexible manufacturing cells for educational purposes," *Fast Reconfiguration of Robotic and Automation Resources* (Colloquium) Oct. 20, 1995, The Institution of Electrical Engineers, Digest. No. 95/174.

Pace, Hugh W. "Valve Actuators Ready for Fieldbus," *Control Engineer* (Oct. 1995), pp. 65-73.

Petti, Thomas F. and Dhurjati, Prasad S. "A Coupled Knowledge Based System Using Fuzzy Optimization for Advisory Control," *IChE Journal* vol. 38 (Sep. 1992) No. 9, pp. 1369-1378.

Pfeifer T. and Fussel B. "Sensorbetriebssystem fur messtechnische Problemstellungen in der Produktionstechnik," *Technisches Messen* vol. 58 (1991) Nos. 7/8.

Phinney, Thomas L. "An Analysis of Contending Proposals in ISA SP-50 for an ISA/IEC Field Instrument Bus," ISA (1988) Paper #88-1489.

Preface: Field Bus Process Control User Layer Technical Support, Feb. 10, 1993.

Product Specification, I/A Series ® RBATCH II.

PROWAY-LAN Industrial Data Highway. (Approved Feb. 3, 1986) ISA—S72.01-1985.

"Radio Field Bus," ISA/SP50—1988-184, ISA Draft.

Schuur, C. "Comments on 'Analysis and Suggestions for ISA-SP50' as submitted to the SP50 Committee by Honeywell Inc." (Mar. 11, 1988) ISA-SP50-1988-155, ISA Draft.

Schuur, Chris and Warrior, Jay. "Philips Token Passing Field Bus Controller Timed Token Mode," ISA/SP50—1988-186, ISA Draft.

"SDRD Using 1553B Data Link Services," ISA/SP50-1988-243 (1988).

Skabowski, E. L. "Recommendations for Consideration at Oct., 1988 Application Layer Subcommittee Meeting," (Oct. 3, 1986).

Solvie, Michael J. "Configuration of Distributed Time-Critical Fieldbus Systems," *IEEE* (1994), p. 211.

Strothman, Jim and Ham, John. "Alliances, Fieldbus, Windows Stir ISA/94 Anaheim Pot," *INTECH* (Dec. 1994), pp. 32-35.

Strothman, Jim and Ham, John. "ISA/95 New Orleans: 'Open', NT winds (not Opal) blow strong," *INTECH* (Nov. 1995), pp. 45-48.

"Suggested Outline for Application Sub-committee Document: Fieldbus Architecture Subcommittee Document," ISA/SP50—1988-175, ISA Draft.

Table of Contents, Automation & Technology Department, 1995.

Table of Contents, Automation & Technology Department, 1993.

Table of Contents, Industrial Computing Society (no date).

Table of Contents, Proceedings of the Industrial Computing Conference, vol. 3, Sep. 19-24, 1993, Chicago, IL. Industrial Computing Society.

[Table of Contents], Proceedings of the 20th International Conference on Industrial Electronics Control and Instrumentation, vols. 1-3, Sep. 5-9, 1994, Bologna, Italy.

[Table of Contents], Proceedings of the 7th Mediterranean Electrotechnical Conference, vol. 1, Apr. 12-14, 1994, Antalya, Turkey.

Table of Contents, ISA/88, Houston, MA, (no date).

Table of Contents, ISA/89, (no date).

Tobin, David. "Southeast Paper Installs Largest Foxboro Distributed Control System."

"User Layer Structure," SP-50 Technical Report (Jul. 25, 1990).

"User Layer Technical Report," ISA/SP50—1990-389C, ISA Draft.

Weinert, A., et al. "RT/OS—realtime programming and application environment for the COSY control system," *Nuclear Instruments and Methods in Physics Research A* vol. 352 (1994), pp. 277-279.

WG1 List of Criteria (Appendix 1), (Oct. 21, 1988) ISA/SP50-1988-242, ISA Draft.

Wood, G. G. "The Argus CONSUL System for On-Line Computer Control," *Electrical Engineering Transactions* (Mar. 1969), pp. 114-118.

Wood, G. G. "The Challenge of Standards for Plant Communication," IFAC Distributed Computer Control Systems (1982), pp. 191-192.

Wood, G. G. "Current Fieldbus activities," *computer communications* vol. 11 (Jun. 1988) No. 3, pp. 118-123.

Wood, Graeme G. "Data Transmission, Processing and Presentation," pp. 46-54.

Wood, G. G. "Evolution of communication standards for the process industry," *Measurement + Control* vol. 19 (Jul./Aug. 1986), pp. 183-188.

Wood, Graeme, Fieldbus Status 1995, *Computing Control Engineering Journal* (Dec. 1995), pp. 251-253.

Wood, Graeme. "Generic Link Transactions for Simple Devices in Fieldbus." ISA/SP50—1988-13 240 (Sep. 20, 1988.

Wood, Graeme, G. "Standardisation Work for Communication Among Distributed Industrial Computer Control Systems—A Status Report," INRIA (1984), pp. 67-69.

Wood, G. G. "Survey of LANs and Standards," *Computer Standards & Interfaces* vol. 6 (1987), pp. 27-36.

Wood, G. G. "Towards digital information control," *Measurement + Control* vol. 21 (Jul./Aug. 1988), pp. 179-180.

\* cited by examiner

METHODS AND APPARATUS FOR FAULT-DETECTING AND FAULT-TOLERANT PROCESS CONTROL

BACKGROUND OF THE INVENTION

The invention pertains to control systems and, more particularly, by way of non-limiting example, to fault-detecting and fault-tolerant methods and apparatus for process control.

The terms "control" and "control systems" refer to the control of the operational parameters of a device or system by monitoring one or more of its characteristics. This is used to insure that output, processing, quality and/or efficiency remain within desired parameters over the course of time.

Control is used number of fields. Process control, for example, is typically employed in the manufacturing sector for process, repetitive and discrete manufactures, though, it also has wide application in electric and other service industries. Environmental control finds application in residential, commercial, institutional and industrial settings, where temperature and other environmental factors must be properly maintained. Control is also used in articles of manufacture, from toasters to aircraft, to monitor and control device operation.

Control systems typically utilize field devices that are physically integrated into the equipment being controlled. For example, temperature sensors are usually installed directly on or within the articles, bins, or conduits that process, contain or transport the materials being measured. Control devices such as valves, relays, and the like, must also be integrated with the equipment whose operations they govern.

Predictability is among the key requirements of any control device. A fluid sensor that even occasionally produces flaky readings is unacceptable. Overengineering can insure better reliability; however, it often results in devices that are too expensive or too large for wide application.

Redundancy is a well accepted alternative to overengineering. It typically involves using two or more standard control elements in place of one. The duplicated units can be field modules, controllers or other higher-level elements in the control hierarchy.

Thus, for example, U.S. Pat. No. 4,347,563 discloses an industrial control system in which redundant processing units serve as bus masters "of the moment," monitoring status information generated by primary processing units. If a redundant unit detects that a primary has gone faulty while executing an applications program, the redundant unit loads that program and takes over the primary's function.

U.S. Pat. No. 5,008,805, on the other hand, discloses a real time control system in which "sender" and "listener" processors synchronously step through sequential schedules, with the sender controlling execution of events sent from a host. The listener monitors the sender and in the event of fault, assumes the role of the latter, executing commands omitted during the takeover interval.

A shortcoming of these and many other prior art redundancy schemes is their imposition of undue computational or hardware overhead. U.S. Pat. No. 5,008,805, for example, has the disadvantage of requiring that the sender and listener operate in lock-step, necessitating common timing lines and up-front synchronization procedures.

An object of this invention is to provide improved methods and apparatus for control and more particularly, for example, for fault-tolerance and fault-detection in process control.

A related object of the invention is to provide such methods and apparatus as demand low computation and hardware overhead and thus, for example, that can be implemented on a wide range of control equipment, from field devices to plant and enterprise servers.

A further object of the invention is to provide such methods and apparatus as can be implemented in new control equipment and retrofitted into pre-existing equipment.

SUMMARY OF THE INVENTION

The foregoing are among the objects attained by the invention which provides, in one aspect, a method of process, environmental or other control (hereinafter, "control") that includes executing a first sequence of instructions in a first process or thread (collectively, "process") and executing a second sequence of instructions in a second process. The processes are loosely coupled, that is, they do not operate in forced lock-step synchronism with one another and need not, for example, share a common clock. Though the processes can operate on the same processor, typically, they operate on different processors, e.g., within separate elements of a control system. Thus, for example, according to some aspects of the invention, the first and second processes are resident and execute on respective partners in paired field devices (e.g., sensors), block controllers, process controllers, and plant or enterprise servers.

The method further includes comparing states of the first and second processes following their respective completions of the first and second instruction sequences. The comparison can cover registers, memory, flags, interrupts, tasks, and/or events for each of the respective processes. Thus, for example, to determine whether the two processes executed their respective sequences substantially identically—and, therefore, are ready to begin to execute additional sequences—one aspect of the invention calls for comparing flags set during execution by the interrupt handlers of each process. Execution of further instruction sequences by either process is delayed, according to related aspects of the invention, pending a favorable comparison of the process states. To this end, one aspect of the invention calls for comparing the states multiple times, e.g., over a predefined time interval. In addition to compensating for non-significant differences in execution speed or event occurrence, employing multiple comparisons insures synchronism, fault-detection, and fault-tolerance, while effectuating loose coupling of the processes.

If the processes achieve comparable states following completion of the first and second sequences, the first process takes up execution of a third sequence, while the second process takes up execution of a fourth sequence. In the event that one of the processes does not complete its respective instruction sequence, or if the process states do not otherwise favorably compare, an error is signaled. Alternatively, or in addition, the method calls for rolling back the processes to performing error diagnostics and/or rolling back the processes to their most recent respective states of agreement, e.g., the states prior to execution of the first and second sequences, and retrying execution of those sequences.

Further aspects of the invention provide methods as described above in which the instruction sequences are selected for execution based on the process states. As above, the state information can include registers, interrupts, memory, flags and/or events in each of the respective processes, though one aspect of the invention calls for the selection to be made based on the tasks queued for completion in each process (e.g., as a result of interrupts received during execution of the prior sequences). Selections made for the respective processes, e.g., the identity of the aforementioned third and fourth sequences, can be compared between the processes. As above, the comparison can be conducted over a predetermined interval and, in the event of non-agreement, an error can be signaled and/or the processes rolled back to a prior state.

Still further aspects of the invention provide control apparatus operating in accord with the above-described methods. These can comprise devices at any level of the process control hierarchy, from process control field device (e.g., sensors) to block controllers to process controllers to plant and enterprise servers.

Still other aspects of the invention provide general purpose digital data processing apparatus and methods paralleling the control apparatus and methods described above.

These and other aspects of the invention are evident in the drawings and in the description that follows.

Systems according to the invention have a number of advantages over the prior art. Among these are that they permit control devices to provide fault-detection and achieve fault tolerance without special-purpose hardware. Instead, only a minimal facility to exchange state information between the modules is necessary. The invention, as evident below, can be used with either hardware-based error detection or software comparison or arbitration. The invention can also be embodied in dual-partnered systems, as well as those that are triply or quadruply redundant.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
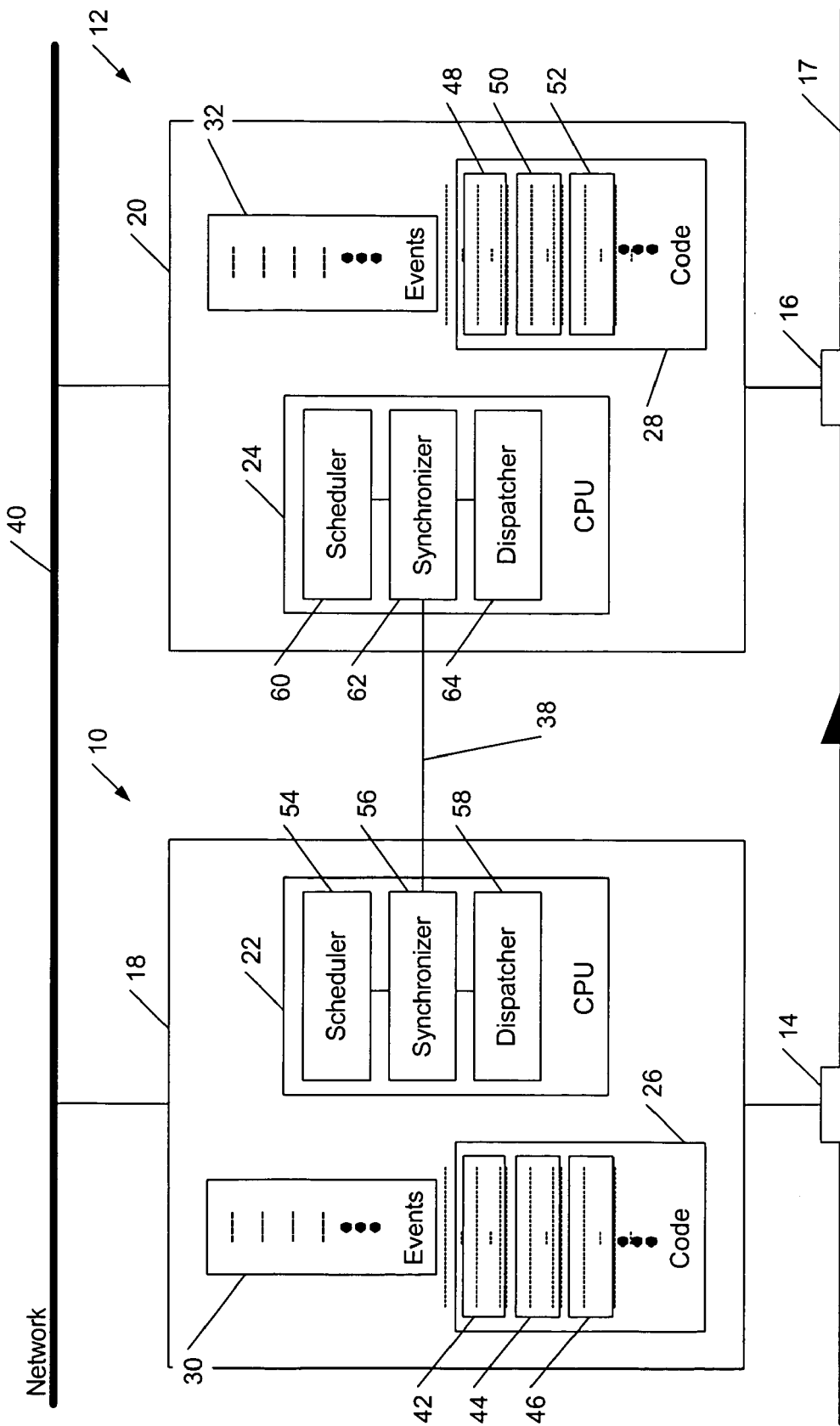
FIG. 1 depicts a pair of process control field devices according to the invention.

FIG. 1 depicts a pair of process control devices 10, 12 according to the invention. The illustrated devices are field devices, though the invention may applied to other control devices as well, such as, by non-limiting example, block controllers, process controllers, plant and enterprise servers, and environmental and industrial controls and controllers.

Illustrated devices 10, 12 include processing sections 18, 20 and sensing apparatus—in this case, by way of non-limiting example, sensors 14, 16 for measuring flow along pipe 17. The sections 18, 20 are constructed and operated in accord with the teachings herein to provide fault detection and fault tolerance. They can also be configured to provide signal conditioning and other functions commonly known in the art. To these ends, illustrated sections 18, 20 can comprise general or special purpose digital data processing apparatus, including central processing units 22, 24 and various storage devices, such as code stores 26, 28 and event stores 30, 32. These storage devices may be embodied in any conventional storage units, such as, by way of non-limiting example, EEPROMS or DRAMS, and they may be implemented in any conventional manner, e.g., arrays, linked lists, b-trees, and so forth. In addition to, or in lieu of such digital data processing apparatus, illustrated sections 18, 20 may comprise analog electronics or other functionality configured for carrying out the tasks described herein.

Control devices 10, 12 are coupled to one another for the exchange of state information of the type described below. In the illustrated embodiment, such exchange takes place over communication pathway 38, which may be connected to the serial, parallel, or other input/output ports of the respective processing sections. Pathway 38 can be implemented via cable, bus, LAN, WAN, Internet, or other direct, indirect or networked medium. Moreover, it may be implemented via conventional cabling or via infrared, microwave or transmission-based medium.

In addition to being coupled to one another, sections 18, 20 can be coupled to other elements of a process control system, such as, block controllers, process controllers, and plant and enterprise servers. In the illustrated embodiment, such coupling is provided via network 40 (e.g., an Ethernet network). As above, this may be implemented via cable, bus, LAN, WAN, Internet, or other direct, indirect or networked medium, using conventional cabling, infrared, microwave or transmission-based medium. Those skilled in the art will, of course, appreciate that the information exchange described below as taking place over line 38 can, instead or in addition, take place over network 40.

Illustrated stores 30, 32 contain information reflecting a state of each respective process control device 10, 12. In the illustrated embodiment, these comprise event flags generated by interrupt handlers (not shown) executing on the respective central processing units 22, 24. The flags represent external interrupts, such as those received from sensors 14, 16, from other process control devices coupled to network 40, and from other peripheral attached directly to devices 10, 12. The flags also represent internal interrupts, such as those generated by watch-dog and other timers (not shown) internal to the processing sections 18, 20.

The state of control devices 10, 12 may be reflected by other information, as well. This can include, for example, pending interrupts, task and event queues, and so forth. As discussed below, state information used in the illustrated embodiment also includes the identity portions of code sequences, i.e., subsequences or slices, elected for execution by each device 10, 12, which information may be maintained, for example, in registers or other memory areas in the devices.

Code stores 26, 28 contain computer instructions ("code") for execution by processing sections 18, 20, e.g., in response to events listed in event stores 30, 32. The code, which may of the type generally known in the art of process control or which may be otherwise suitable therefore (whether or not currently known), is preferably parceled into units or "slices" 42–52. These slices may be, for example, indivisible or "atomic" sequences of code. They may also be divisible sequences sized for efficient execution in view of the synchronization methodologies described herein. As discussed below, a preferred slice represents an increment of work that is small enough to be completed in a time interval consistent with the delay that can be accepted if the thread executing it is preempted.

Illustrated central processing units 22, 24 are of the conventional type known in the art of executing instruction sequences within processes, threads and other such instruction execution contexts (collectively, "processes"). In addition to slices 42–52 contained in code stores 26, 28, the CPUs 22, 24 execute code for purposes of identifying events and scheduling slices (i.e., synchronizing-schedulers 54, 60), synchronizing event identification and slice selection (i.e., synchronizers 56 62), and dispatching slices for execution (i.e., dispatchers 58, 64).

In the illustrated embodiment, code executed by the CPUs 22, 24 and, particularly, code executed from stores 26, 28, is broken up into execution slices 42–52. An execution slice is an increment of work that is small enough to be completed in a time interval consistent with the delay that can be accepted if the process or thread executing it is preempted. In addition, each slice starts at the logical beginning of an operation, and ends when the operation is completed. At slice completion, the execution is between contexts.

While this approach can be applied to general purpose software, it is particularly suited to applications that have an appropriately "sliceable" structure. Process control software has this characteristic. Exploiting it accomplishes two things. The first is to reduce the "operating system" to a simple synchronizing-scheduler. The second is that the synchronizing-scheduler 54, 60 simplifies attaining fault tolerance. It is this simplification, among other things, which makes it possible to support fault tolerant operation with the available hardware resources.

Each synchronizing-scheduler 54, 60 recognizes and synchronizes all pending events. As discussed above, events typically result from interrupts, e.g., clock interrupts, communication interrupts, etc., that have occured during execution of a prior slice. Some events, indeed, are a natural result of slice execution itself, e.g., events reflecting the availability of data computed by the prior slice. After each synchronizing-scheduler 54, 60 synchronizer its pending events with the other synchronizing-scheduler (or, other synchronizing-schedulers), it selects a next slice for execution, and synchronizes that selection. In some embodiments, the identities of the slices selected for execution are not synchronized; rather, merely, the fact that slices have been selected for execution.

Figure 2:
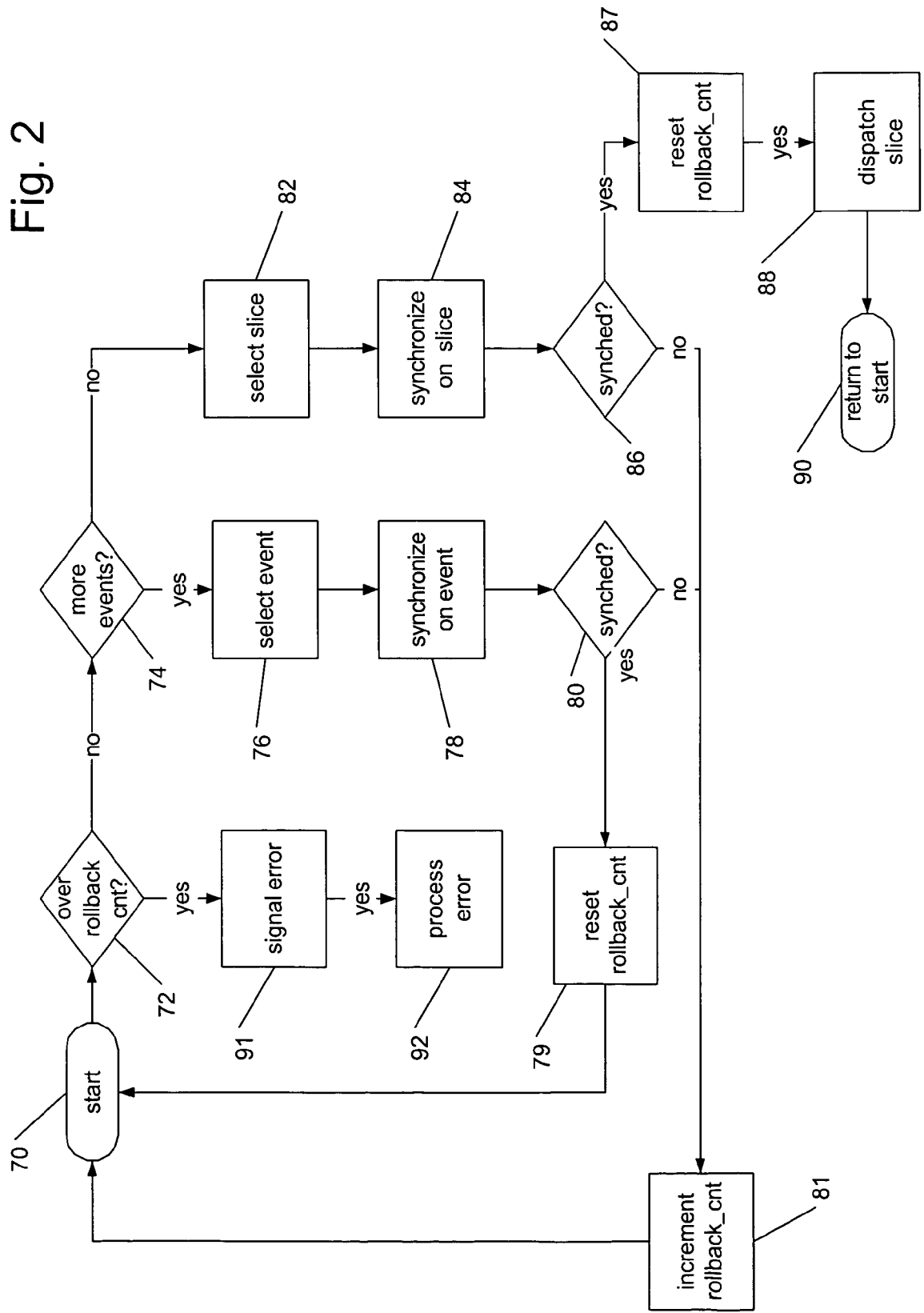
FIG. 2 depicts a method of operation of a synchronizing-scheduler in the devices of FIG. 1.

Operation of the illustrated synchronizing-schedulers 54, 60 is shown in FIG. 2 and described in the pseudo-code fragment that follows:

```
while true (step 70)
    if rollback_cnt>max_rollbacks break; (step 72)
    if more unsynchronized events then (step 74)
        select highest priority pending event (step 76)
        invoke synchronizer to confirm that partner selected
            same event (step 78)
        if synchronization was successful (step 80)
            rollback_cnt=0(step 79)
        else
            increment rollback_cnt (step 81)
        endif
        continue
    endif
    select code slice for execution to process event (step 82)
    invoke synchronizer to confirm that partner selected
        same slice (step 84)
    if synchronization not successful (step 86)
        increment rollback_cnt (step 81)
        continue
    endif
    rollback_cnt=0(step 87)
    dispatch to execute selected slice (step 88)
end while
signal error (step 91)
perform error handling (step 92)
```

The type and degree of error handling in step 92 depends on the nature of the application. In some embodiments, no error handling at all is performed after the fault is signalled. In other embodiments, the processes are rolled back to state of last agreement. In still other embodiments, a fault diagnostic procedure is performed to isolate the source of error.

Figure 3:
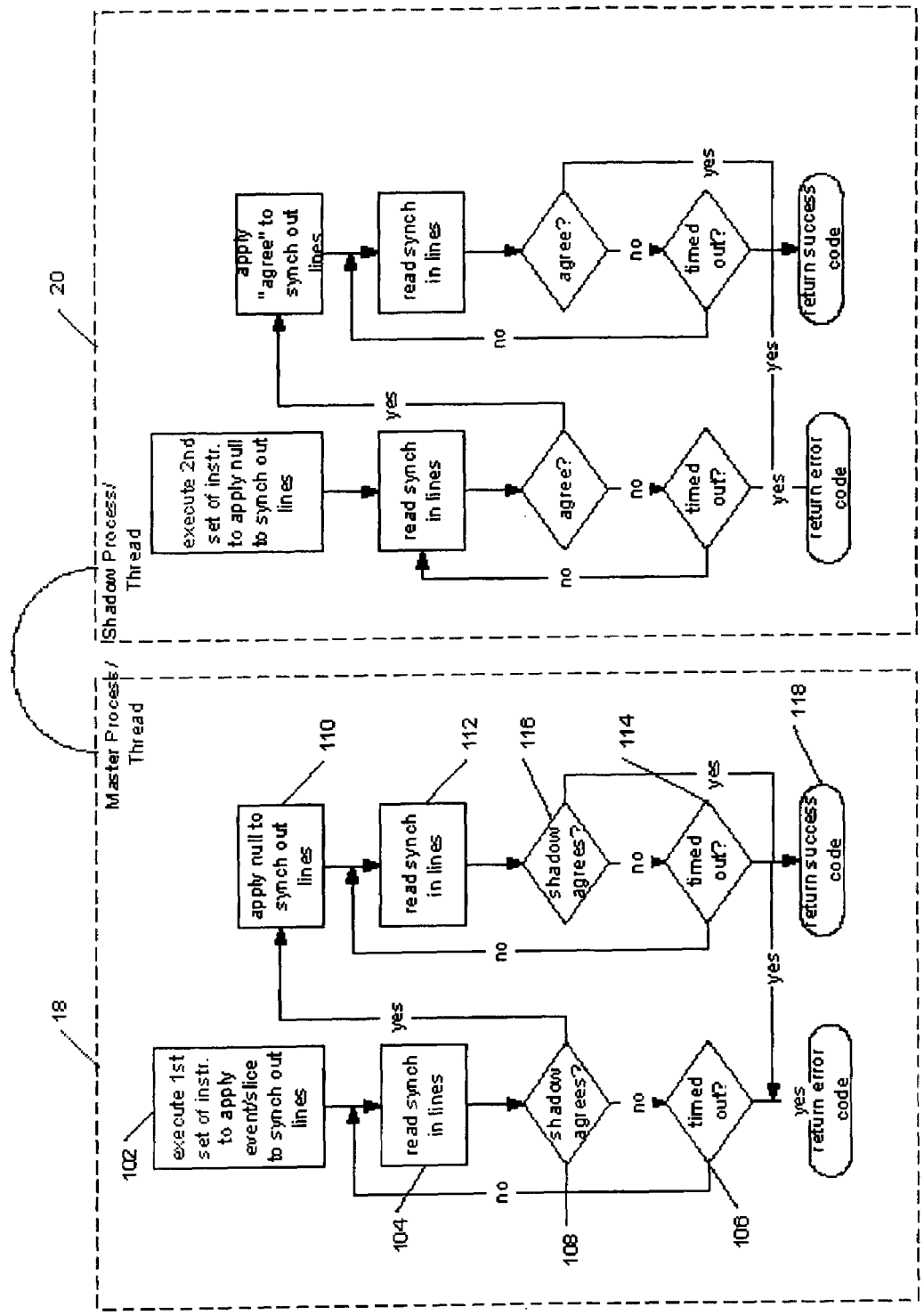
FIGS. 3A and 3B depict a method of operation of a synchronizer in the devices of FIG. 1.

As noted above, devices 10, 12 on both sides of the redundant pair have synchronization, or sync, lines 38 running between them that are used to keep their operation synchronized. This enforces loose coupling between the devices 10, 12 and, more particularly, between their respective processing sections 18, 20. One of the devices 10 is configured to be the master, and the other 12, the shadow. The synchronizer operation for the master 10 is shown in FIG. 3A and described in the pseudo-code that follows:

```
write event/slice code on sync out lines (step 102)
set timeout register
initialize sync results to false
do
    decrement timeout register
    read input from partner (step 104)
while shadow agrees=false and timeout !=0 (step 106)
if timeout register !=0 (step 108)
    write "null" code on sync out lines (step 110)
    do
        decrement timeout register
        read input from partner (step 112)
    while shadow agrees=true and timeout !=0 (step 114)
endif
if timeout register !=0 (step 116)
    sync results=true (success) (step 118)
endif
return sync results
```

The shadow 12 executes a similar synchronization routine, which is described below and shown in FIG. 3B.

```
set timeout register initialize sync result
to false
do
    decrement timeout register
    read master synch state
while shadow state !=master state and timeout !=0
operation code and timeout register !=0
if timeout register !=0
    write "shadow agrees" on synch line
    do
        decrement timeout register
        read input from partner
    while master state !="null" and timeout !=0
endif
if timeout register !=0
    synch results=success
endif
return synch results
```

Figure 4:
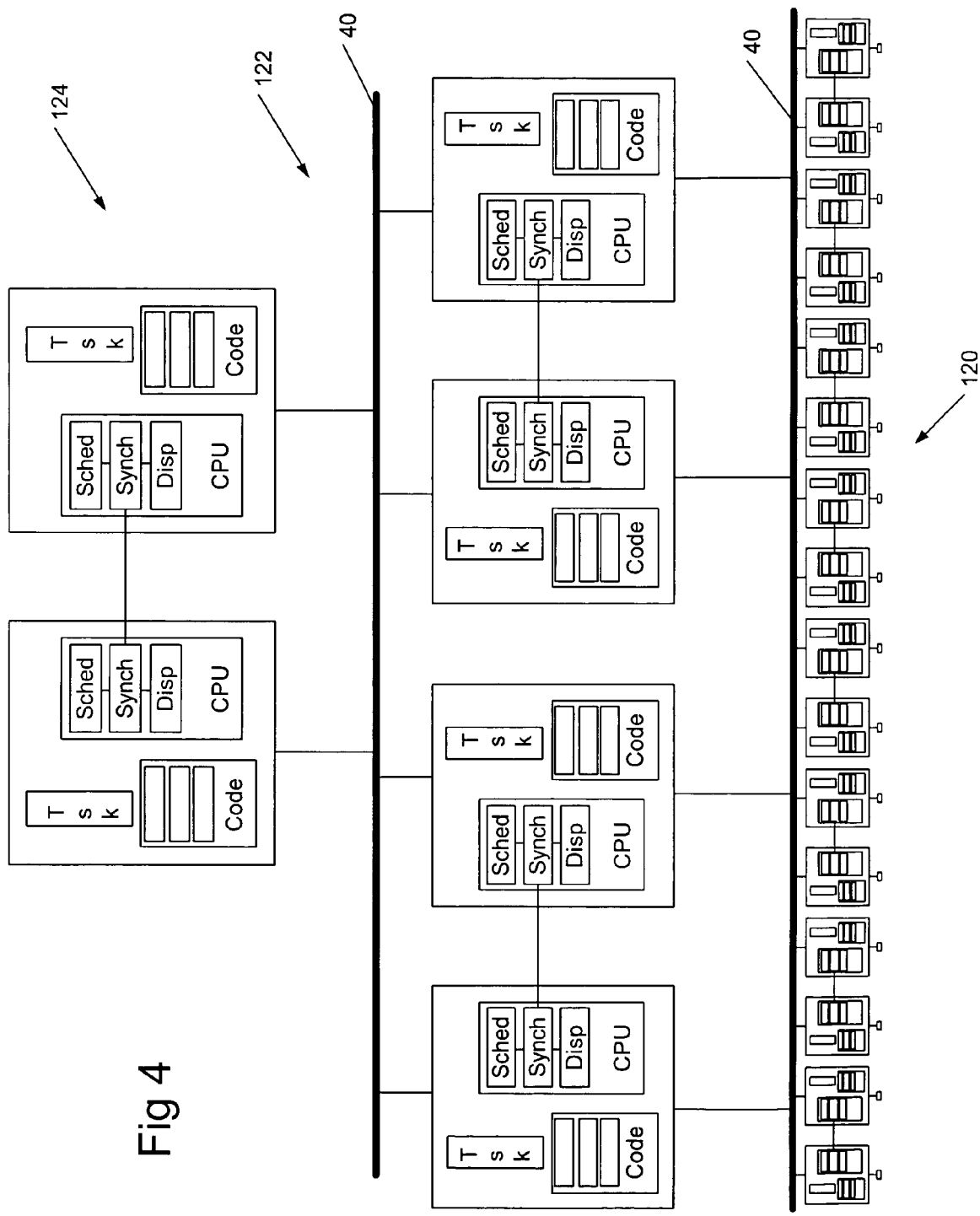
FIG. 4 depicts a process control system with field devices, control processors and plant or enterprise servers according to the invention.

As noted above, the invention can be applied to process control apparatus other than field devices 10, 12, as well. A process control system in which the invention is employed in a plurality of pairs of process control devices 120, block controllers 122 and plant servers 124 is illustrated in FIG. 4. Although the processing performed by these various apparatus differs in accord with their levels in the system, their processing sections perform scheduling and synchronization in the manner describeds above in order to provide fault-detection and tolerance.

In one embodiment, the invention is employed in coprocessors that serve as communication controllers for a network of field modules. Such coprocessor can be contained, for example, within one or more of the block controllers 122 of the type shown in FIG. 4. Software executing on the CPUs of those coprocessors is both multithreaded and fault tolerant. It constitutes a complete stand-alone executable that sits directly on top of the hardware, preferably, without the need for a separate operating system.

The aformentioned embodiment is multithreaded with priority scheduling. It does this without a general purpose context-preserving task switch mechanism. Instead the work is broken up into execution slices as described above. The basis of the slices chosen for the coprocessors is to associate a slice with the work required to send or receive a particular message over network 40. There are two reasons for this. First, the hardware events associated with the network activity are good synchronization markers. Second, when one considers fault tolerant error recovery scenarios, the last completed network message is a good point to restart from.

Within the aformentioned coprocessors, each channel is an independent stream of communications transactions associated with a set of data structures in memory that they share between them. A channel is also an execution thread. Each channel has a unique priority. On the "host" side of the shared memory interface, each channel is associated with a vrtx task of corresponding priority.

The communications channels are identical except for priority and assigned buffer sizes. The number of channels is controlled by the initialization of master control structures contained in the shared memory. They share a single common set of routines that execute three basic types of slices:

1. routines that convert a list of transaction requests into the corresponding request messages;

2. routines that send the messages and wait for the replies;

3. routines that convert the messages into the required lists of responses

The execution state of each channel is recorded in a channel data structure within the shared memory. Once started, execution of the slice continues until it completes. The stored state information identifies the next slice to be executed, if any, for each channel.

Fault tolerance error scenarios include exception cases where a slice in progress cannot be completed. In these cases, it is simply abandoned. Because the channel data that controls scheduling is not updated until the slice completes, the slice will be restarted from its beginning when/if the execution thread is resumed.

At a logical and priority level above the communications channels, the master control structures provide what can be thought of as a master control channel. Associated actions at this level always complete. They are independent slices. They range from bus switching to mechanisms for fault tolerance exception handling. Each synchronizing-scheduler within the coprocessors checks the master control structure, then the channel information in priority order, to identify the highest priority slice available for execution. Interrupts are serviced during slice execution, but any resulting thread switch occurs after the current slice is completed.

After a synchronizing-scheduler selects the next slice, it invokes its respective synchronizer. During married fault tolerant operation, the synchronizers in the master and shadow use hardware handshake lines and logic as described to ensure that the both sides choose the same next slice. If this process fails, the synchronizers proceed as described above.

In this coprocessor embodiment, the sync lines transmit data with the following values and meanings:

0. NULL (no sync state being declared)
1. Entering sched
2. Host interrupt
3. Transmit sync
4. Receive event
5. Time event
6. Interrupt to Host
7. Error case Continuing discussion of the aformentioned embodiment, the synchronizer must be able to unambiguously establish success or failure and it must always return the same value on both sides. To this end, the hardware handshake in the coprocessor uses three parallel lines from master to shadow and 1 from shadow to master. The logic above has a timing window. If the shadow sets the "shadows agress" true just as the master times out, the master will return failure and the shadow will return success. The master mus to continue to assert the synch code for a brief intercval after it sees the shadow agrees signal. The shadow then checks that the masters synch code is set to null slightly after the agree line goes true. Those skilled in the art will, of course, appreciate that operation of any given synchronizer will depend strongly on the number of different states that require recognition and the hardware resources available to support it.

Described herein are methods and apparatus meeting the desired objects. Those skilled in the art will appreciate that the specific embodiments shown in the drawings and described above are examples of the invention and that other embodiments incorporating changes therein also fall within the scope of the invention. Thus, for example, it will be appreciated that the invention can be applied to process, industrial, environmental and other control systems and devices utilizing triple modular redundancy, quaduple modular redundancy and still higher levels of redundancy, as well as to those utilizing paired units (or double modular redundancy) as shown in the examples herein. By way of further example, it will be appreciated that the partnered processes can exchange and compare state information different than that described here. By way of still further example, it will be appreciated that the invention can be applied to digital data processing apparatus and systems, as well.

In view of the foregoing what I claim is:

1. A computerized method of operation of a control system, comprising
   A. with a first scheduler associated with a first process selecting a highest priority event associated with the first process, where the first process is any of a first computer process and a first computer thread,
   B. with a second scheduler associated with a second process the second process being loosely coupled with respect to the first process, selecting a highest priority event associated with the second process, where the second process is any of a second computer process and a second computer thread,
   C. with each of the first scheduler and the second scheduler, comparing for identity of the highest priority event selected by the first scheduler with the highest priority event selected by the second scheduler,
   D. with the first scheduler, responding to an agreement of identity indicated in step (C) by selecting a first sequence of instructions in the first process, E. with the second scheduler, responding to an agreement of identity indicated in step (C) by selecting a second sequence of instructions in the second process,
F. with each of the first and second schedulers, comparing for identity of the selection made by the first scheduler with the selection made by the second scheduler,
G. with the first scheduler, responding to an agreement of identity indicated in step (F) by executing, in the first process, the first sequence of instructions,
H. with the second scheduler, responding to an agreement of identity indicated in step (F) by executing, in the second process, the second sequence of instructions,
I. responding to a non-agreement of identity occurring more than a selected number of times in any of steps (C) and (F) by rolling back each of the first and second processes to prior states in which an agreement of identity indicating the first process and the second process executed their respective instruction sequences substantially identically was achieved, and
J. wherein each of the first and second processes execute on any of a process control field device, a block controller, a process controller, a process control plant server, a process control enterprise server, an industrial control device, an industrial control system, an environmental control device, an environmental control system, other control device, and other control system.

2. A method according to claim 1, comprising the step of executing steps (C)–(H) one or more times over a time interval in order to determine whether the first and second processes achieve comparable states following completion of execution of the first sequence of instructions by the first process.

3. A method according to claim 2, comprising the step of responding to an agreement of identity indicated in steps (C) and (F) by repeating steps (A)–(I) with a third instruction sequence in place of the first sequence of instructions, and with a fourth instruction sequence in place of the second sequence of instructions.

4. A method according to claim 3, comprising the steps of
selecting the third instruction sequence as a function of a state of the first process following execution of the first sequence of instructions, and
selecting the fourth instruction sequence as a function of a state of the second process following execution of the second sequence of instructions.

5. A method according to claim 4, comprising comparing the state of the first process prior to execution by it of the third instruction sequence with the state of the second process prior to execution by it of the fourth instruction sequence.

6. A method according to claims 1, 3 or 5, comprising the step of signaling an error in response to a failure of the first and second processes to achieve comparable states at a time of comparison.

7. A method according to claim 1, wherein any of steps (C) and (F) comprises comparing any of registers, memory, flags, interrupts, tasks, and events in the respective processes.

8. A method according to claim 1, wherein each of the first and second processes comprise any of a thread and a process, and wherein the first and second processes execute on any of the same and different digital data processing apparatus.

9. A control apparatus comprising one of more digital data processors capable of executing any of a process or a thread, comprising A. a first scheduler associated with a first process the first scheduler configured to select a highest priority event associated with the first process, where the first process is any of a first computer process and a first computer thread,
B. a second scheduler associated with a second process the second scheduler configured to select a highest priority event associated with the second process, where the second process is any of a second computer process and a second computer thread,
C. each of the first scheduler and the second scheduler further configured to compare for identity of the highest priority event selected by the first scheduler with the highest priority event selected by the second scheduler,
D. the first scheduler further configured to respond to an agreement of identity indicated in step (C) by selecting a first sequence of instructions in the first process,
E. the second scheduler further configured to respond to an agreement of identity indicated in step (C) by selecting a second sequence of instructions in the second process,
F. each of the first scheduler and the second scheduler further configured to compare for identity of the selection made by the first scheduler with the selection made by the second scheduler,
G. the first scheduler further configured to respond to an agreement of identity indicated in step (F) by executing, in the first process, the first sequence of instructions,
H. the second scheduler further configured to respond to an agreement of identity indicated in step (F), by executing, in the second process, the second sequence of instructions,
I. each of the first scheduler and the second scheduler further configured to respond to a non-agreement of identity occurring more than a selected number of times in any of steps (C) and (F) by rolling back each of the first and second processes to prior states in which an agreement of identity indicating the first process and the second process executed their respective instruction sequences substantially identically was achieved, and
J. wherein each of the first and second processes execute on any of a process control field device, a block controller, a process controller, a process control plant server, and a process control enterprise server, industrial control device, an industrial control system, an environmental control device, an environmental control system, other control device, and other control system.

10. An apparatus according to claim 9, wherein any of the first scheduler and the second scheduler is configured to compare any of registers, memory, flags, interrupts, tasks, and events in each of the respective processes.

11. An apparatus according to claim 10, wherein,
the first scheduler is configured to select a third sequence of instructions as a function of a state of the first process following execution of the first sequence of instructions,
the second scheduler is configured to select a fourth sequence of instructions as a function of a state of the second process following execution of the second sequence of instructions.

12. An apparatus according to claim 11, wherein each of the first and second schedulers are configured to compare the state of the first process prior to execution by it of the third instruction sequence with the state of the second process prior to execution by it of the fourth instruction sequence.

13. An apparatus according to claims 9, 11 or 12, wherein each of the first and second schedulers are configured to compare a state of the first process with a state of the second process a plurality of times to determine whether the first and second processes to achieve comparable states.

14. An apparatus according to claim 9, wherein each of the first and second processes comprise any of a thread and a process, and wherein the first and second processes execute on any of the same and different digital data processing apparatus.

* * * * *

UNITED STATES PATENT AND TRADEMARK OFFICE
CERTIFICATE OF CORRECTION

PATENT NO.         : 7,043,728 B1
APPLICATION NO. : 09/328828
DATED              : May 9, 2006
INVENTOR(S)        : Samuel Galpin Page 1 of 1

It is certified that error appears in the above-identified patent and that said Letters Patent is hereby corrected as shown below:

Col. 8, in Claim 1, Line 62, following "for identity", please delete "of".

Col. 8, in Claim 1, Line 5, following "for identity", please delete "of".

Col. 9, in Claim 9, Line 1, following "first process", please insert --,--.

Signed and Sealed this

Seventh Day of November, 2006

JON W. DUDAS
*Director of the United States Patent and Trademark Office*